United States Patent
Ögren

(10) Patent No.: US 7,610,052 B2
(45) Date of Patent: Oct. 27, 2009

(54) SHARING META INFORMATION MEDIA FILE

(76) Inventor: Per Ögren, Per Wellersgatan 2, SE-211 34 Malmö (SE)

(*) Notice: Subject to any disclaimer, the term of this patent is extended or adjusted under 35 U.S.C. 154(b) by 321 days.

(21) Appl. No.: 10/587,880

(22) PCT Filed: Jan. 13, 2005

(86) PCT No.: PCT/EP2005/000254

§ 371 (c)(1),
(2), (4) Date: Jul. 27, 2006

(87) PCT Pub. No.: WO2005/076577

PCT Pub. Date: Aug. 18, 2005

(65) Prior Publication Data

US 2007/0167044 A1    Jul. 19, 2007

Related U.S. Application Data

(60) Provisional application No. 60/543,609, filed on Feb. 11, 2004.

(30) Foreign Application Priority Data

Feb. 4, 2004    (EP) .................................. 04002435

(51) Int. Cl.
*H04W 24/00* (2009.01)
(52) U.S. Cl. ............... 455/456.3; 455/41.2; 709/238
(58) Field of Classification Search ............. 455/41.2, 455/456.3; 709/238
See application file for complete search history.

(56) References Cited

U.S. PATENT DOCUMENTS

| | | | |
|---|---|---|---|
| 6,832,242 B2 * | 12/2004 | Keskar | 709/204 |
| 6,871,047 B2 * | 3/2005 | Iwata | 455/41.2 |
| 7,260,646 B1 * | 8/2007 | Stefanik et al. | 709/238 |
| 2001/0032335 A1 | 10/2001 | Jones | 725/105 |
| 2002/0090912 A1 | 7/2002 | Cannon et al. | |
| 2002/0090954 A1 | 7/2002 | Tanaka et al. | 455/456 |
| 2004/0009750 A1 | 1/2004 | Beros et al. | 455/41.2 |
| 2005/0107120 A1 * | 5/2005 | Yueh | 455/557 |
| 2005/0165795 A1 * | 7/2005 | Myka et al. | 707/100 |

FOREIGN PATENT DOCUMENTS

| EP | 1 278 366 | 1/2003 |
|---|---|---|
| WO | WO 02/44906 | 6/2002 |

OTHER PUBLICATIONS

International Preliminary Report on Patentability for PCT/EP2005/000254 dated Mar. 2, 2006.
First Office Action of Chinese Patent Application No. 200580003762.6. Office Action was issued on May 8, 2009.

* cited by examiner

*Primary Examiner*—Nick Corsaro
*Assistant Examiner*—Isaak R Jama
(74) *Attorney, Agent, or Firm*—Myers Bigel Sibley & Sajovec

(57) ABSTRACT

Methods, portable communication devices, and computer program products for sharing at least one media file of a portable communication device with a set of electronic communication devices include detecting a setting, by a user, of the set of electronic communication devices. The portable communication device generates at least one media file. At least a link, related to the media file, is distributed to at least the electronic communication devices of the set which were located in a region of the portable communication device, at the time of the generation of the at least one media file.

12 Claims, 3 Drawing Sheets

SHARING META INFORMATION MEDIA FILE

RELATED APPLICATIONS

The present application is a 35 U.S.C. §371 national phase application of PCT International Application No. PCT/EP2005/000254, having an international filing date of Jan. 13, 2005 and claiming priority to European Patent Application No. 04002435.8, filed Feb. 4, 2004 and U.S. Provisional Application No. 60/543,609 filed Feb. 11, 2004, the disclosures of which are incorporated herein by reference in their entireties. The above PCT International Application was published in the English language and has International Publication No. WO 2005/076577.

TECHNICAL FIELD OF THE INVENTION

The present invention relates in general to sharing of media files. More particularly it relates to distributing at least a link, related to a media file having meta information, from one portable communication device to electronic communication devices.

DESCRIPTION OF RELATED ART

Taking pictures and recording video clips have become popular, for instance in the field of mobile phones. The number of generated files, of which some are provided in the form of media files, thus increases.

Pictures taken at various sightseeing spots are often of interest to other people than just the photographer. People on the pictures are often interested in how the pictures looks like and how they look like on the pictures. Also, people who attended the photographing, although not being the object of the pictures, can be interested in looking at the them.

It is moreover interesting to see how people you know, friends, family, look like on pictures. Also, it can be interesting to show other people who you know, your new house, newly bought car, the resort at which you are staying at the moment or what happened your dog, Sylvain, during vacation.

For these reasons and possibly many more people are interested in pictures and prefer receiving and keeping a copy them.

Manually sharing images among, for instance, five persons can be time consuming and tiresome. Different perforations of objects further makes sharing a difficult and boring task to do. To be sure that all five persons actually receive the images that he or she is interested in, in reality means that each person needs to share his/her images with all members of the group.

This manual sharing would comprise giving all friends, who for instance went for a journey together, a picture or a copy of a recorded film. As indicated above, due to the sharing being tiresome and time consuming, very few people end up receiving a copy of the file. The pictures can also be sent in for instance MMS messages. However, then the photographer has to keep track of which picture to send to whom.

It would be advantageous with a sharing procedure that would facilitate sharing media files acquired at, for instance, a sightseeing spot.

There is thus a need for providing a procedure with which media files automatically are shared among a group of people, for instance, at a sightseeing spot.

SUMMARY OF INVENTION

The invention is thus directed towards solving the problem of providing a procedure with which media files automatically are shared among a group of people.

This is achieved by distributing at least a link, related to an acquired media file, to a selection of users which are within reach of the device which acquired said media file.

One object of the present invention is thus to provide a method for sharing at least a link related to an acquired media file to a selection of users which are within reach of the device which acquired said media file.

According to a first aspect of the present invention, this object is achieved by a method for sharing at least one media file of a portable communication device with a set of electronic communication devices, comprising the steps:

detecting a setting, by a user, of the set of electronic communication devices, generating said at least one media file by said portable communication device, and distributing at least a link, related to the media file, to at least the electronic communication devices of the set which were located in a region of said portable communication device, at the time of the generation of said at least one media file.

A second aspect of the present invention is directed towards a method including the features of the first aspect, in which said region is within a radius from the portable communication device.

A third aspect of the present invention is directed towards a method including the features of the first aspect, wherein the step of detecting the determination of the set of electronic communication devices, comprises detecting a pairing of the portable communication device with at least one electronic communication device of the set of devices, made under the control of the user.

A fourth aspect of the present invention is directed towards a method including the features of the third aspect, wherein detecting the pairing comprises initiating a connection between the portable communication device and the paired electronic communication devices and wherein the step of distributing further comprises distributing said media file over said initiated connection.

A fifth aspect of the present invention is directed towards a method including the features of the first aspect, wherein the step of distributing further comprises distributing said media file to at least the electronic communication devices that were located in the region of said portable communication device, at the time of the generation of said at least one media file.

A sixth aspect of the present invention is directed towards a method including the features of the first aspect, further comprising the step:

providing meta information related to the media file, so that the media file can be distributed with said meta information.

A seventh aspect of the present invention is directed towards a method including the features of the sixth aspect, wherein the step of providing meta information, comprises providing meta information in relation to the electronic communication devices of the set, which were located in the region of said portable communication device, at the time of the generation of said at least one media file.

An eighth aspect of the present invention is directed towards a method including the features of the fourth aspect, in which the connection is a wireless connection.

A ninth aspect of the present invention is directed towards a method including the features of the fourth aspect, in which the connection is a Bluetooth® Wireless Technology connection.

A second object of the present invention is to provide a portable communication device for sharing at least a link related to an acquired media file to a selection of users which are within reach of the device which acquired said media file.

According to a tenth aspect of the present invention, this object is achieved by a portable communication device for sharing at least one media file with a set of electronic communication devices, where said portable communication device comprises:

a media unit, provided for generating a media file, a control unit, connected to the media unit, arranged to detect a setting of the set of electronic communication devices, by a user, and provided for distributing at least a link, related to the media file, to the electronic communication devices of the set which were located in a region of said portable communication device, at the time of the generation of said at least one media file, for connecting to a wireless communication unit to enable wireless communication over a wireless communication interface between the wireless communication unit associated with said portable communication device and a wireless communication unit associated with at least one electronic communication device of the set.

An eleventh aspect of the present invention is directed towards a portable communication device including the features of the tenth aspect, further comprising:

the wireless communication unit for enabling wireless communication over a wireless communication interface between the wireless communication unit associated with said portable communication device and the wireless communication unit associated with said at least one electronic communication device, wherein the wireless communication unit associated with the portable communication device is connected to the control unit.

A twelfth aspect of the present invention is directed towards a portable communication device including the features of the tenth aspect, wherein the wireless communication unit is a Bluetooth® Wireless Technology unit.

A thirteenth aspect of the present invention is directed towards a portable communication device including the features of the tenth aspect, wherein the portable communication device is a mobile phone.

A third object of the present invention is to provide a computer program product for sharing at least a link related to an acquired media file to a selection of users which are within reach of the device which acquired said media file.

According to a fourteenth aspect of the present invention, this object is achieved by a computer program product comprising a computer readable medium, having thereon:

computer program code means, to make a portable communication device execute, when said program code means is loaded in the device:

detect a setting of a set of electronic communication devices, generate said at least one media file by said first portable communication device, and distribute at least a link, related to the media file, to the electronic communication devices in the set which were located in a region of said portable communication device, at the time of the generation of said at least one media file, so as to enable facilitated sharing of at least one media file of the portable communication device with said electronic communication devices.

A fourth object of the present invention is to provide a computer program element for sharing at least a link related to an acquired media file to a selection of users which are within reach of the device which acquired said media file.

According to a fifteenth aspect of the present invention, this object is achieved by a computer program element having computer program code means, to make a portable communication device execute, when said computer program element is loaded in the device:

detect a setting of a set of electronic communication devices, generate said at least one media file by said first portable communication device, and distribute at least a link, related to the media file, to the electronic communication devices in the set which were located in a region of said portable communication device, at the time of the generation of said at least one media file, so as to enable facilitated sharing of at least one media file of the portable communication device with said electronic communication devices.

The Present Invention has the Following Advantages:

The process of sharing acquired pictures among a selection of known people, according to the first aspect of the present invention, is automated and rapid.

The same first aspect of the present invention has the further advantageous property that within a distance from the user acquiring the picture, said picture is distributed to all predefined friends.

According to the sixth aspect of the present invention, it is an advantage to gain information on who participated on the picture, from meta information contained in the picture, and to be able to read out to whom an acquired picture was sent, before exchanging viewpoints and impressions on related information.

The possibility to add meta information to the picture, according to the seventh aspect of the present invention, is an advantage since it often happens that some information of the meta information type is missing, when subsequently looking at pictures.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE EMBODIMENTS

The present invention relates to provision of a portable communication device, a method and a system for sharing of at least one media file of a portable communication device, with other communication devices.

Figure 1:
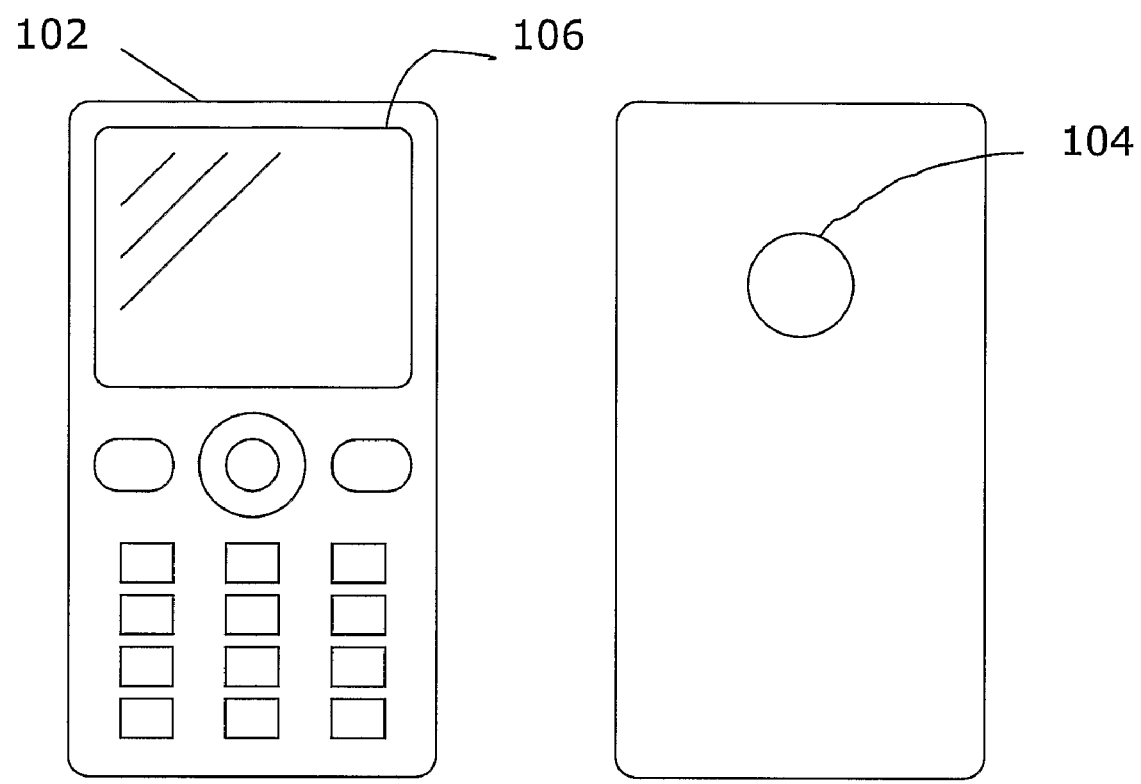
FIG. 1 shows a portable electronic device according to a preferred embodiment of the present invention in the form of a mobile phone.

By referring to FIG. 1 showing a portable communication device in the form of a mobile phone, a short description of one idea related to the invention is offered.

By using the mobile phone, 102, in FIG. 1, equipped with an image capturing unit, 104, in the form of a camera, and a display, 106, still pictures can be recorded and shown on said display, 106.

The desire is to provide a method that facilitates sending a copy of the picture to electronic communication devices located in the vicinity of the portable communication device equipped with the image capturing unit.

According to a preferred embodiment of the present invention, this desire is fulfilled in that the mobile phone of the photographer detects the electronic communication devices of his/her travel mates, based on input data from the user, i.e. the photographer, creating a set of electronic communication devices. Just after the user has taken a picture, the mobile phone determines which ones of the electronic communication devices are located close to the mobile phone and defines a subset out of those communication devices. The mobile phone then offers the user a possibility to connect text data to the picture by adding text data, inserted by the user, to the meta information of the picture. Thereafter, the picture is distributed to said subset of users, whose electronic communication devices were located close to the mobile phone at, or shortly after, the time a picture was acquired.

Figure 2:
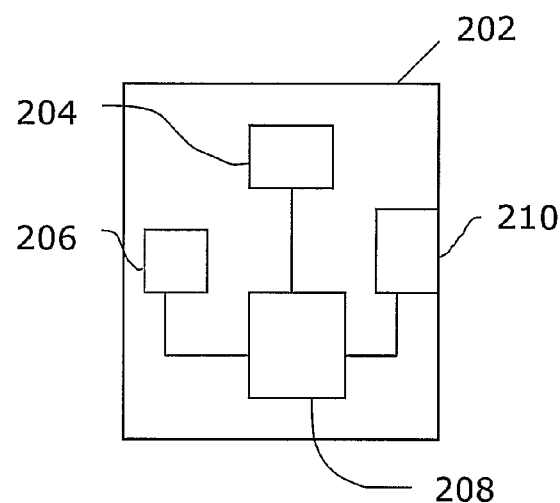
FIG. 2 shows a portable electronic device according to a preferred embodiment of the present invention.
Figure 3:
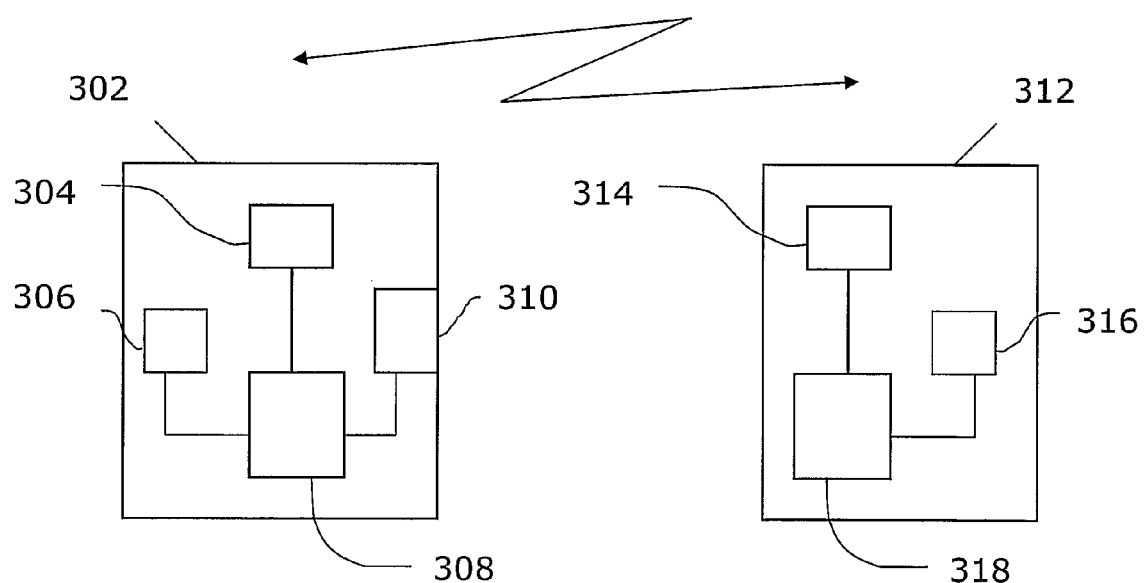
FIG. 3 visualizes a portable communication device communicating with an electronic communication device.
Figure 4:
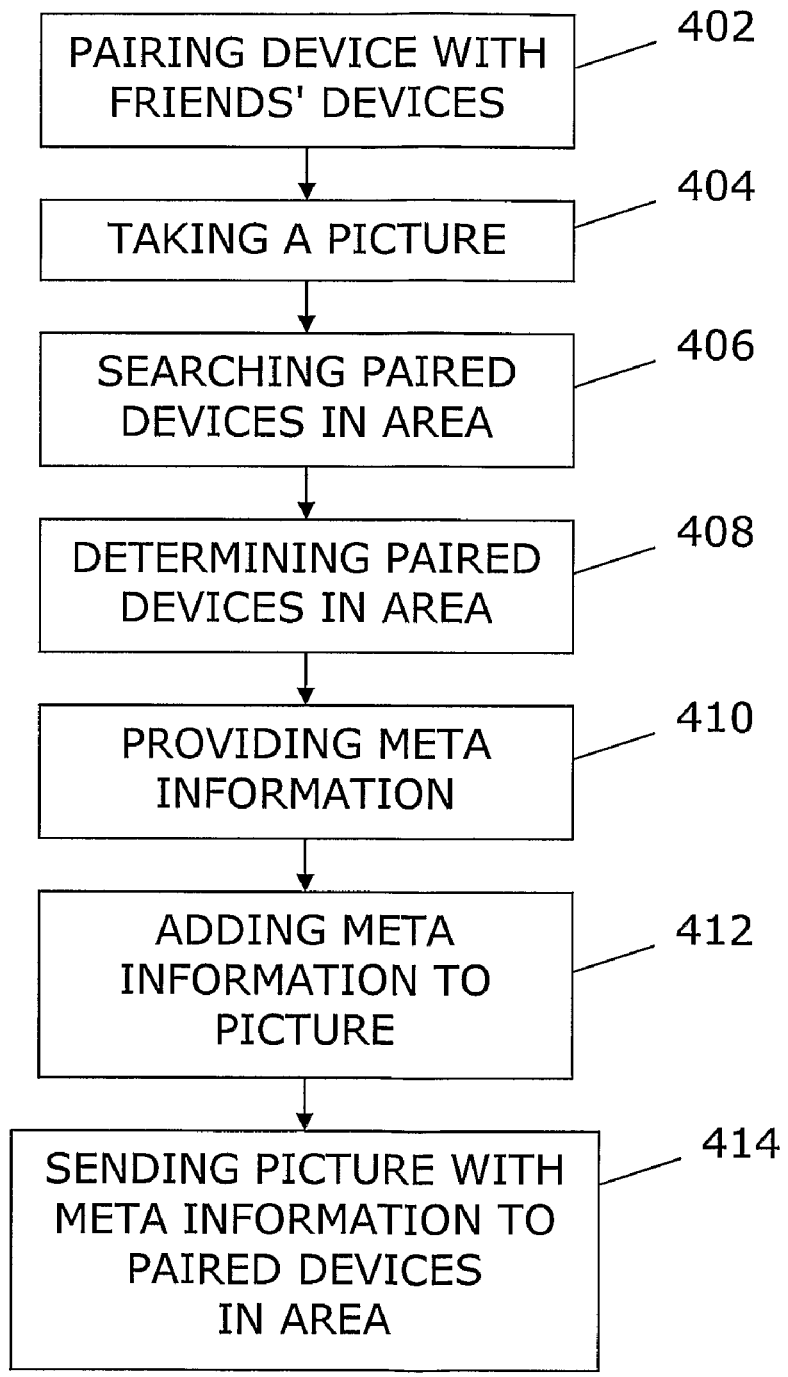
FIG. 4 presents a flow chart of the method for sharing of at least one media file, according to a preferred embodiment of the present invention.

With reference to FIG. 2, showing a portable communication device according to the preferred embodiment of the present invention, FIG. 3, visualizing a portable communication device connected with an electronic communication device, and FIG. 4, presenting a flow chart of the method for sharing of at least one media file, according to a preferred embodiment of the present invention, the invention will now be explained in more detail.

In FIG. 2, the portable communication device, 202, is schematically shown, and comprises a wireless communication unit, 204, a memory unit, 206, an image capturing unit, 210, and a control unit, 208, to which said units, 204, 206 and 210, are connected.

According to one preferred embodiment of the invention, the wireless communication unit, 204 in FIG. 2, is a Bluetooth® Wireless Technology unit.

According to one preferred embodiment of the present invention, the method for sharing of at least one media file, comprises the step of pairing a device with friends' devices, where the friend's devices are a set of electronic communication devices, step 402, with the mobile phone, 102, of the user. With reference to FIG. 3, this pairing comprises initiating a wireless connection between the wireless communication unit, 304, here the Bluetooth® Wireless Technology unit, of the mobile phone, 302, of the user, and a Bluetooth® Wireless Technology unit, 314 of another communication device, 312, of a friend's device. Upon this pairing of the devices, the initiated connection is established and the two devices is put at, a ready-to-send, ready-to-receive, data standby position. Moreover by pairing the user's device with devices of his travel mates, friends, family, colleagues and so on, a limited set of devices is set, to which pictures can be distributed later on.

The step of pairing, step 402, is in this embodiment of the present invention followed by the step of taking a picture, step 404, by the user of the mobile phone. According to an alternative embodiment of the present invention the picture, acquired by the user, is a moving picture, to be distributed to the electronic communication devices, 312.

After the step of taking the picture, step 404, the mobile phone of the user performs the step of searching for paired electronic communication devices within an area. According to a preferred embodiment of the present invention, that is, for example, by using the Bluetooth® Wireless Technology communication unit, the mobile phone searches for paired electronic communication devices within an area defined as within the range of said Bluetooth® Wireless Technology communication unit of said mobile phone of the user.

By searching for devices within the range of the Bluetooth® Wireless Technology communication unit, the mobile phone searches for electronic communication devices within the set or group, for instance belonging to friends, among the persons being the object or the friends participating in the picture, the people watching the capturing of the picture, the friends behind the user capturing the picture, in short the friends within a distance from the user, where said distance is defined by the range of the Bluetooth® Wireless Technology communication unit of the mobile phone of the user.

Having searched for paired electronic communication devices within said range, it is determined which ones of said paired devices are located near the scene of the capturing of the picture at, or shortly after, the time the picture was taken.

After the determination of which ones of the electronic communication devices actually were near or at the scene for the picture capturing, information on the users of these electronic communication devices is collected in the step of providing meta information, step 410. Since the identified electronic communication devices are paired with the mobile phone, information on their users is accessible to the mobile phone. Meta information is typically extracted from entries in a phone book in the mobile phone.

Subsequent to the step of providing meta information, step 410, a step of adding meta information to picture, step 412, is followed. Within this step, the user of the mobile phone, is able to add more text information to the meta information of the picture. For instance, the location where the picture was acquired, a comment regarding persons, other than the friends of the user of the mobile phone, featuring on the picture, etcetera, can be made accessible by the user of the mobile phone.

Subsequently, the acquired picture is distributed in the step of sending picture with meta information to paired devices with the area, step 414. By once more referring to FIG. 3, the picture is, in this step, sent to the electronic communication devices, 312, which are paired with the mobile phone, 302, belonging to the user, that is the photographer. As the communication unit, 314, of the electronic communication device, 312, and the communication unit, 304, of the mobile phone, 302, each are Bluetooth® Wireless Technology communication units, according to a preferred embodiment of the present invention, the devices need to be located such that the communication units are located within the range of each others Bluetooth® Wireless Technology communication unit, at the time or short after the time the picture was acquired.

In order for the mobile phone to be able to send the acquired picture to an electronic communication device, 312, belonging to, for instance, a friend, said electronic communication device, 312, has to be located within the area at the time of sending the picture too, according to this preferred embodiment of the present invention, using the Bluetooth® Wireless Technology.

The pictures which have been sent from the communication unit, 304, of the mobile phone, 302, to the communication unit, 314, of the electronic communication devices, 312, can be stored in the memory unit, 316, in the electronic communication device, 312, by the control unit, 318, under control of the user of said electronic communication device, 312.

By utilizing the control unit, 318, of the electronic communication device, 312, the received pictures can be processed and viewed on a screen associated with said electronic communication device, 312.

Figure 5:
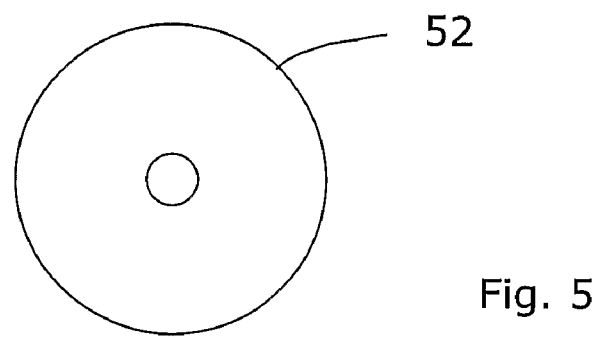
FIG. 5 shows a computer program product, according to a preferred embodiment of the present invention.

Moreover, FIG. 5 presents a computer program product, in the form of a CD-ROM disc according to the present invention, on which computer program elements, for performing the process of the described method can be stored.

It is emphasized that this invention can be varied in many ways, of which the alternative embodiments above and below only are a few examples. These different embodiments are hence non-limiting examples. The scope of this present invention, however, is only limited by the subsequently following claims.

According to another embodiment of the present invention, the user of the portable communication device determines the set of electronic communication devices by identifying them by inputting their phone numbers or their names. Based on this information the user's portable communication device detects determining the set of electronic communication devices.

According to yet another embodiment of the present invention, the limited area within people are provided with pictures, is searched by using Global Positioning Systems (GPS) services, or positioning using GSM services or triangulation.

According to yet a different embodiment of the present invention, the distributing of, at least a link to, a picture to the electronic communication devices, by using Bluetooth® Wireless Technology communication units, is postponed in case the Bluetooth® Wireless Technology connection between the portable communication device and the paired electronic communication device is broken. At the time the connection between said devices is reestablished, the, at least a link to the, picture is distributed to the electronic communication device.

According to yet another embodiment of the present invention, the distribution of pictures is performed by using MMS services in the mobile phone network.

According to still yet another embodiment of the present invention, the picture is distributed to a WEB site, to which the people of the other communication devices, related to the acquired pictures, can gain access by using a link that is sent to them by the user of the portable communication device.

According to still yet another embodiment, the computer program product is a portable memory in the form of a memory stick.

According to a different embodiment of the present invention, the computer program product, on which computer program elements, for performing the process of the described method, can be used, is any one of: a Digital Versatile Disc (DVD), an Enhanced Digital Versatile Disc (EVD), a Mini disc (MD), a Magneto-optical (MO) disc, a Digital Audio Tape (DAT), and a Universal Serial Bus (USB) memory.

According to yet a different embodiment of the present invention, the computer program product, on which computer program elements, for performing the process of the described method, can be stored, is a flash memory card of any of the types: Compact Flash, Smart Media, SD Cards, MMC Cards, XD Picture Card and the like.

According to an alternative embodiment of the present invention, the computer program code, containing computer program elements for performing the process of the described method, can be downloaded from a remote server.

With the present invention has thus been described a method, a portable communication device, a computer program product and a computer program element for sharing of at least a link related to a media file of a portable communication device with a set of electronic communication devices, having the following advantages:

The sharing of pictures is automated and quick.

The invention offers a possibility to add meta information to the picture, which is an advantage since it often happens that some information of the meta information type is missing, when looking at pictures.

Every picture that is acquired by a user of a group, is wirelessly shared to his/her friends within a distance from the user.

It is further an advantage to gain information on who participated on the picture, from the included meta information.

It is advantageous to be able to read out to whom an acquired picture was sent, before exchanging viewpoints and impressions on related information.

The invention claimed is:

1. A method for sharing at least one media file of a portable communication device with a set of electronic communication devices, comprising:
    detecting a setting, by a user, of the set of devices,
    generating the at least one media file by the portable communication device,
    providing meta information together with the media file, the meta information being information in relation to the electronic communication devices of the set, which were located in the region of the portable communication device, at the time of the generation of the at least one media file; wherein the media file comprises a picture that is generated when the user records the picture with a camera on the portable communication device, wherein the meta information comprises text information including information that identifies the users of the electronic communication devices of the set, the location where the picture was acquired, a comment regarding identity of persons in the picture and/or information extracted from entries in a phone book of the electronic communication device;
    automatically distributing at least a link, related to the media file, to at least the electronic communication devices of the set which were located in a region of the portable communication device a distance or radius from the portable communication device at the time the picture is acquired with the camera on the portable communication device at the time of the generation of said at least one media file.

2. A method according to claim 1, wherein the region is within a radius from the portable communication device.

3. A method according to claim 1, wherein detecting a setting comprises detecting a communication network pairing of the portable communication device with at least one electronic communication device of the set of devices.

4. A method according to claim 3, wherein detecting the pairing comprises initiating a communication connection between the portable communication device and the paired electronic communication devices and wherein the step of distributing further comprises distributing the media file over the initiated connection.

5. A method according to claim 1, wherein the distributing at least a link further comprises distributing the media file to at least the electronic communication devices that were located in the region of the portable communication device, at the time of the generation of the at least one media file.

6. A method according to claim 4, in which the connection is a wireless communication connection.

7. A method according to claim 4, in which the connection is a Bluetooth® Wireless Technology connection.

8. A portable communication device for sharing at least one media file with a set of electronic communication devices, the portable communication device comprising:

a media unit configured to generate a media file, a control unit, connected to the media unit, configured to detect a setting of the set of electronic communication devices, by a user, to provide meta information together with the media file in relation to the electronic communication devices of the set, which were located in the region of the portable communication device, at the time of the generation of the at least one media file, wherein the media file comprises a picture that is generated when the user records the picture with a camera on the portable communication device, wherein the meta information comprises text information including information that identifies the users of the electronic communication devices of the set, the location where the picture was acquired, a comment regarding identity of persons in the picture and/or information extracted from entries in a phone book of the electronic communication device, and to automatically distribute at least a link, related to the media file, to the electronic communication devices of the set which were located in a region of the portable communication device a distance or radius from the portable communication device at the time that the picture is acquired with the camera on the portable communication device, at the time of the generation of the at least one media file, for connecting to a wireless communication unit to enable wireless communication over a wireless communication interface between the wireless communication unit associated with the portable communication device and a wireless communication unit associated with at least one electronic communication device of the set.

9. A portable communication device according to claim 8, wherein the wireless communication unit associated with the portable communication device is connected to the control unit.

10. A portable communication device according to claim 8, wherein the wireless communication unit is a Bluetooth® Wireless Technology unit.

11. A portable communication device, according to claim 8, wherein the portable communication device is a mobile phone.

12. A computer program product configured to share at least one media file of a portable communication device with a set of electronic communication devices, the computer program product comprising a computer readable medium having computer readable program code embodied therein, the computer readable program product comprising:

computer readable program code configured to detect a setting of a set of electronic communication devices, computer readable program code configured to generate the at least one media file by the first portable communication device, computer readable program code configured to provide meta information together with the media file, the information being meta information in relation to the electronic communication devices of the set, which were located in the region of the portable communication device, at the time of the generation of the at least one media file, wherein the media file comprises a picture and the picture is generated when the user records the picture with a camera on the portable communication device, wherein the meta information comprises text information including information about the users of the electronic communication devices of the set, the location where the picture was acquired, a comment regarding persons in the picture and/or information extracted from entries in a phone book of the electronic communication device, and computer readable program code configured to automatically distribute at least a link, related to the media file, to the electronic communication devices in the set which were located in a region of the portable communication device a distance or radius from the portable communication device at the time that the picture is acquired with the camera on the portable communication device, at the time of the generation of the at least one media file, so as to enable facilitated sharing of at least one media file of the portable communication device with the electronic communication devices.

* * * * *